E. J. FINK.
GRINDING TOOL.
APPLICATION FILED APR. 11, 1910.

964,636.

Patented July 19, 1910.
2 SHEETS—SHEET 1.

Witnesses
C. H. Walter
E. Daniels

Inventor
Edward J. Fink
By Byrnes Townsend + Brickenstein
Attorneys

E. J. FINK.
GRINDING TOOL.
APPLICATION FILED APR. 11, 1910.

964,636.

Patented July 19, 1910.

2 SHEETS—SHEET 2.

Witnesses
C. N. Walker.
E. Daniels.

Inventor
Edward J. Fink
By Byrnes Townsend & Brickenstein
Attorneys

UNITED STATES PATENT OFFICE.

EDWARD J. FINK, OF SYCAMORE, ILLINOIS.

GRINDING-TOOL.

964,636. Specification of Letters Patent. Patented July 19, 1910.

Application filed April 11, 1910. Serial No. 554,633.

*To all whom it may concern:*

Be it known that I, EDWARD J. FINK, a citizen of the United States, residing at Sycamore, in the county of Dekalb and State of Illinois, have invented certain new and useful Improvements in Grinding-Tools, of which the following is a specification.

My invention relates to lens grinding tools and particularly to that class of devices for grinding the curved surfaces of cylindrical or toric lenses; and has for its object the provision of a simple machine of inexpensive construction, whereby the lenses may be ground with convex or concave surfaces of any desired radii.

Another object of my invention is to construct a device, capable of adjustment, for the grinding of lenses of various curvatures, this being accomplished, preferably, by providing the tool with a divided grinding lap or bed, that is, a grinding bed wherein the portion forming the concave or convex grinding surface is split into two or more parts, these parts being adjustable with relation to each other, so that the grinding surface may be made to assume the position required for grinding a surface of any desired radius.

While I have shown in this application several forms which my invention may take, these being sufficient for the purpose of illustration, it is obvious that many other forms may suggest themselves to those familiar with this class of machines.

Figure 1:
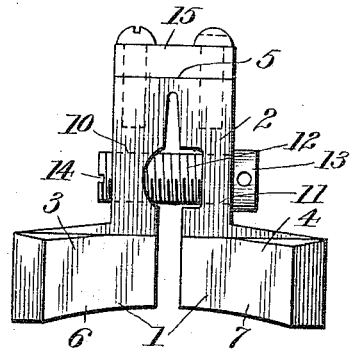
Figure 2:
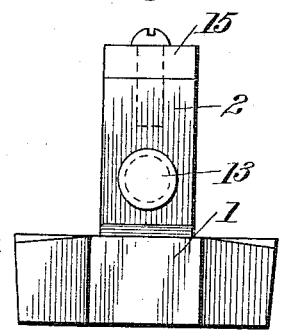
Figure 3:
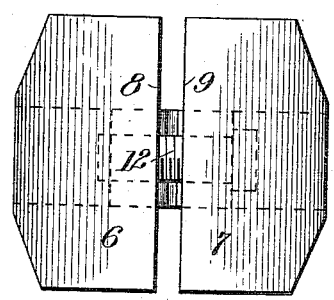
Figure 4:
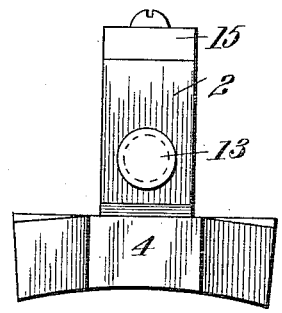
Figure 5:
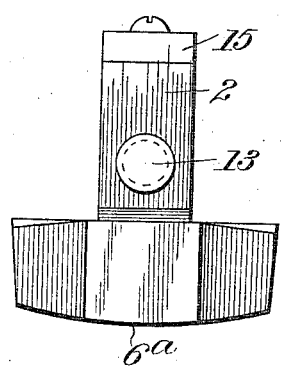
Figure 6:
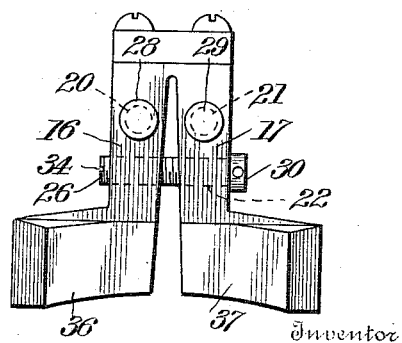
Figure 7:
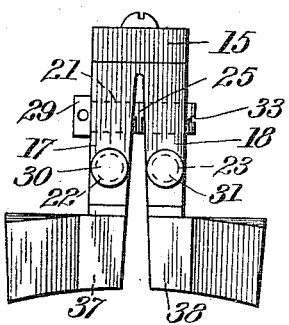
Figure 8:
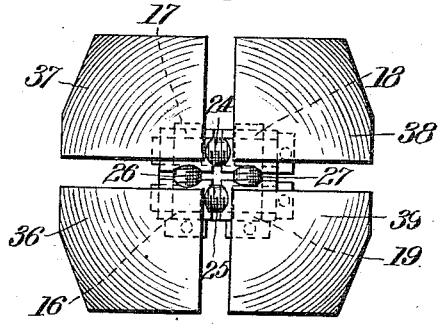
Figure 9:
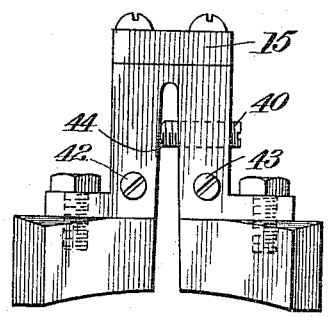
Figure 10:
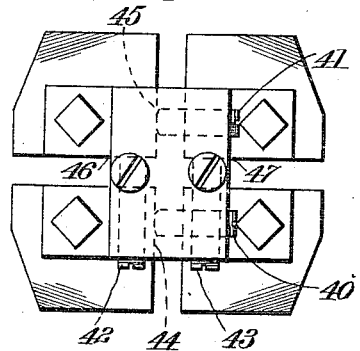
Figure 11:
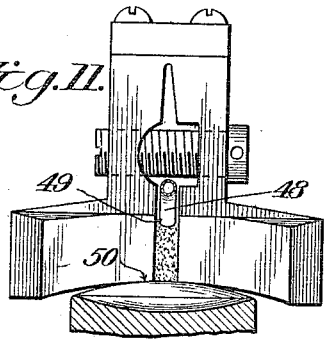

In the accompanying drawings, Figure 1 represents a front elevation of a simple form of my device, suitable for grinding convex cylindrical surfaces; Fig. 2 represents a side elevation of the same; Fig. 3 represents a bottom view, looking onto the curved grinding surface of the lap; Fig. 4 represents a side view, similar to Fig. 2, of a tool adapted for grinding convex toric surfaces; Fig. 5 represents a side elevation of a device adapted to grind concave cylindrical surfaces; Fig. 6 represents a front elevation of a tool, similar to that shown in Fig. 1, with double adjustment means; Fig. 7 represents a side view of the tool shown in Fig. 6; Fig. 8 represents a bottom view looking onto the grinding bed of the tool shown in Fig. 6; Fig. 9 represents a front view of a tool with somewhat modified adjusting means; Fig. 10 represents a top plan view of the device shown in Fig. 9; and Fig. 11 represents a front view of a simple form of my device, showing an arrangement for feeding the abrasive to the grinding surface of the bed.

Referring to the drawings, 1 represents a block of metal, such as is commonly used in the manufacture of tools of this character, provided with the extending portions 2 of tempered spring steel or the like, these portions being either integral with the main part 1, as shown in Fig. 1, or separate therefrom and adapted to be secured to it by short bolts or the like, as shown in Fig. 9. The main body of the block 1 is split or divided into symmetrical parts 3 and 4, the split reaching also up some distance into or through the extending portion 2, and each of the parts 3 and 4 is cut away as at 6, 7, on its under surface, in such a manner that a continuous curved surface might be formed when the inner adjacent edges 8, 9 are brought together. These parts 6 and 7 may be cut away so as to present a surface curved only at right angles to the direction of the split, that is, a cylindrical surface with the axis parallel to the split, as shown in Figs. 1, 2 and 3; or the surfaces 6 and 7 may be curved in directions both longitudinal and transverse of the split, thus forming if the parts were brought together a continuous double curved surface, suitable for grinding toric or spherical lenses; a side view of such a construction is shown in Fig. 4. The legs of the extending portion 2 are provided somewhat below the middle with circular openings 10 and 11, one of these at least being threaded, running at right angles to the split, and adapted to receive a threaded bolt or screw 12 supplied with a fixed nut 13 on one end, and with the usual groove 14 on the other. It will be readily seen that if the screw 12 is turned by a screwdriver or other tool, on account of the resiliency afforded in the use of spring metal in the portion 2, the parts 6 and 7 will be made to approach or separate, according to the direction of turning of the screw, and thus alter at will the degree of the total curvature formed by the combined curvatures of the separate parts 6 and 7.

While in the tool adjusted as above described for various curvatures, the new surfaces formed will not present absolutely true and continuous curves, it has been found that in the rough grinding of lenses such an adjustment is of decided advantage, and that the slight diversions from the true cylindrical or spherical surfaces caused thereby are of no material consequence.

If desired, a metal cap 15 may be secured across the top of the portion 2, by screws or otherwise, to alleviate any undue strain upon the narrow part occasioned by the split.

In Fig. 5 I have shown a side view of a tool, having a curved grinding surface 6ª, constructed in accordance with my invention, adapted to be used in grinding concave surfaces as concave cylindrical lenses.

It has been found desirable for some purposes, as in grinding spherical or toric lenses, to construct a tool which will permit of a double adjustment, i. e., an adjustment of the curvature longitudinal of the split as well as an adjustment of the curvature at right angles to the split. This can be accomplished readily by providing in addition to the single split, as described above, a second split preferably at right angles to the first, with adjustments in both directions; and such an arrangement I have illustrated in Figs. 6, 7, and 8, where, it will be seen, there are four legs 16, 17, 18 and 19, each being provided with two circular openings at right angles to each other, those sets marked 20, 21 being a little distance above the sets designated as 22 and 23. These openings are adapted to receive the screws or threaded bolts 24, 25, 26, and 27 similar to but somewhat smaller than the bolt 12. Either the portions of the screw-passages adjacent to the nuts or heads 28, 29, 30, 31, or the portions adjacent to the grooved ends 32, 33, 34, 35 of the threaded bolts, are provided with threads adapted to engage the threads of the inserted bolt; so that by properly turning any or all of the screw-bolts 24, 25, 26, 27 a fairly accurate adjustment of the separated parts 36, 37, 38 and 39, and hence of the various portions of the curved surface carried by them, can be effected, to form a practically continued concave or convex grinding surface of any desired radii.

In the construction illustrated in Figs. 9 and 10, I have shown an arrangement whereby the parts forming the grinding bed will return automatically to their normal position upon simply withdrawing the screw or screws 40, 41, 42, 43, which, when screwed into operating position, impinge upon the non-imperforated walls 44, 45, 46, 47, forcing them apart to a greater or less extent, depending upon the degree of curvature desired.

In Fig. 11, I have illustrated in a simple form of tool a convenient means, afforded by the split, of supplying the abrasive material used to the grinding surface. A supported tube or other suitable conduit 48 is inserted some distance into the slot 49, and as the grinding is carried on the abrasive is fed to the surface 50 as desired through it. Such a construction is of much advantage since it obviates the necessity of raising the grinding bed at intervals, as has been done previously with solid tools, to supply the abrasive.

I claim:

1. A grinding tool comprising a divided grinding bed, and members resiliently connecting the divided parts of said grinding bed, said members having means for effecting adjustment of the divided parts to produce on the grinding bed surfaces of various desired curvatures.

2. An integral grinding tool comprising a divided grinding bed, members resiliently connecting the divided parts of said grinding bed, and screws for effecting adjustment of the divided parts to produce on the grinding bed surfaces of various desired curvatures.

3. A grinding tool comprising a curved grinding bed divided into sections in planes at an angle to each other, members connecting the sections in pairs, and adjusting means for varying the relative positions of each pair.

In testimony whereof, I affix my signature in presence of two witnesses.

EDWARD J. FINK.

Witnesses:
W. F. AUSTIN,
JESSIE SULLIVAN.